(12) United States Patent
Faust et al.

(10) Patent No.: US 12,504,763 B2
(45) Date of Patent: Dec. 23, 2025

(54) NUDGE PROXIMITY INDICATION DURING CONTROL OF AN UNLOADING OPERATION

(71) Applicant: Deere & Company, Moline, IL (US)

(72) Inventors: Jeremy J. Faust, Grimes, IA (US); Kellen E. O'Connor, Clive, IA (US)

(73) Assignee: DEERE & COMPANY, Moline, IL (US)

( * ) Notice: Subject to any disclaimer, the term of this patent is extended or adjusted under 35 U.S.C. 154(b) by 248 days.

(21) Appl. No.: 18/352,576

(22) Filed: Jul. 14, 2023

(65) Prior Publication Data

US 2024/0142990 A1 May 2, 2024

Related U.S. Application Data

(60) Provisional application No. 63/512,368, filed on Jul. 7, 2023, provisional application No. 63/381,178, filed on Oct. 27, 2022, provisional application No. 63/381,187, filed on Oct. 27, 2022.

(51) Int. Cl.
*A01D 43/00* (2006.01)
*A01D 90/10* (2006.01)
*G05D 1/00* (2006.01)

(52) U.S. Cl.
CPC .......... *G05D 1/0289* (2013.01); *A01D 90/10* (2013.01); *G05D 1/0011* (2013.01)

(58) Field of Classification Search
CPC .... G05D 1/0289; G05D 1/0011; A01D 90/10; A01D 43/087
See application file for complete search history.

(56) References Cited

U.S. PATENT DOCUMENTS

| | | | |
|---|---|---|---|
| 8,060,283 B2 | 11/2011 | Mott et al. | |
| 8,868,304 B2 | 10/2014 | Bonefas | |
| 9,119,342 B2 | 9/2015 | Bonefas | |
| 9,326,444 B2 * | 5/2016 | Bonefas | A01D 43/073 |
| 9,642,305 B2 | 5/2017 | Nykamp et al. | |
| 9,861,040 B2 | 1/2018 | Bonefas | |
| 9,992,931 B2 | 6/2018 | Bonefas et al. | |

(Continued)

FOREIGN PATENT DOCUMENTS

| | | |
|---|---|---|
| CN | 108550141 A | 9/2018 |
| DE | 102009027245 A1 | 12/2010 |

(Continued)

OTHER PUBLICATIONS

Extended European Search Report and Written Opinion issued in European Patent Application No. 23202822.5, dated Mar. 19, 2024, in 07 pages.

(Continued)

*Primary Examiner* — Masud Ahmed
(74) *Attorney, Agent, or Firm* — Christopher J. Volkmann; KELLY, HOLT & CHRISTENSON PLLC

(57) ABSTRACT

A leading vehicle controls a following vehicle during a fill operation to change the positions of the two vehicles relative to one another. A control system generates a communication signal indicating that a position change operation that changes the position of the vehicles relative to one another is about to be executed. An operator display displays an indication of the position change operation prior to commencing the position change operation.

20 Claims, 12 Drawing Sheets

(56) References Cited

U.S. PATENT DOCUMENTS

| | | |
|---|---|---|
| 11,957,078 B1* | 4/2024 | Herichkoff .............. B60P 1/36 |
| 2012/0215394 A1 | 8/2012 | Wang et al. |
| 2013/0211658 A1* | 8/2013 | Bonefas .............. A01D 43/087 701/28 |
| 2014/0224377 A1 | 8/2014 | Bonefas |
| 2015/0264866 A1 | 9/2015 | Foster et al. |
| 2017/0042088 A1* | 2/2017 | Nykamp ............ A01D 41/1217 |
| 2017/0055446 A1* | 3/2017 | Nykamp ............. A01D 43/087 |
| 2018/0042179 A1* | 2/2018 | Bonefas ................. A01D 75/00 |
| 2020/0039306 A1 | 2/2020 | Rogan |
| 2020/0319655 A1 | 10/2020 | Desai et al. |
| 2021/0195840 A1 | 7/2021 | Puryk et al. |
| 2021/0294337 A1 | 9/2021 | Van Mill et al. |
| 2021/0329840 A1 | 10/2021 | Craig |
| 2021/0337729 A1 | 11/2021 | O'Connor et al. |
| 2022/0015288 A1 | 1/2022 | Christiansen et al. |
| 2022/0071078 A1* | 3/2022 | Boyer .................... A01D 90/10 |
| 2022/0287239 A1 | 9/2022 | Faust et al. |
| 2022/0408645 A1* | 12/2022 | O'Connor ............ A01D 34/008 |
| 2022/0410704 A1 | 12/2022 | O'Connor et al. |
| 2023/0031013 A1* | 2/2023 | Faust ................... A01D 41/127 |
| 2024/0032474 A1* | 2/2024 | Ritter ................... A01B 79/005 |
| 2024/0123892 A1* | 4/2024 | Graff ......................... B60P 1/40 |
| 2024/0130294 A1* | 4/2024 | Currie ...................... B60D 1/02 |
| 2024/0147901 A1* | 5/2024 | Debbaut .............. A01D 43/087 |

FOREIGN PATENT DOCUMENTS

| | | | |
|---|---|---|---|
| DE | 102012211001 A1 | 1/2014 | |
| DE | 102015109799 A1 | 12/2016 | |
| DE | 102016214320 A1 | 2/2017 | |
| EP | 1219153 A2 | 7/2002 | |
| EP | 2044826 A2 | 4/2009 | |
| EP | 2245917 A2 | 11/2010 | |
| EP | 2995191 A1 | 3/2016 | |
| EP | 3316218 A1 | 5/2018 | |
| EP | 3815486 A1 | 5/2021 | |
| EP | 3949714 A1 | 2/2022 | |
| EP | 3955183 A1 | 2/2022 | |
| EP | 4056019 A1 | 9/2022 | |
| EP | 4062740 A1 | 9/2022 | |
| EP | 4070636 A1 | 10/2022 | |
| EP | 4101286 A1 | 12/2022 | |
| WO | WO 2022036114 A1 | 2/2022 | |

OTHER PUBLICATIONS

Extended European Search Report and Written Opinion issued in European Patent Application No. 23203069.2, dated Mar. 18, 2024, in 07 pages.
Extended European Search Report and Written Opinion issued in European Patent Application No. 23203519.6, dated Mar. 14, 2024, in 05 pages.
Extended European Search Report and Written Opinion issued in European Patent Application No. 23203536.0, dated Mar. 14, 2024, in 06 pages.
Extended European Search Report and Written Opinion issued in European Patent Application No. 23203537.8, dated Mar. 14, 2024, in 05 pages.
Extended European Search Report and Written Opinion issued in European Patent Application No. 23202466.1, dated Mar. 26, 2024, in 07 pages.
Extended European Search Report and Written Opinion issued in European Patent Application No. 23202485.1, dated Mar. 26, 2024, in 07 pages.
Extended European Search Report and Written Opinion issued in European Patent Application No. 23203067.6, dated Mar. 26, 2024, in 11 pages.
Extended European Search Report and Written Opinion issued in European Patent Application No. 23202510.6, dated Apr. 4, 2024, in 08 pages.
Extended European Search Report and Written Opinion issued in European Patent Application No. 23202817.5, dated Apr. 23, 2024, in 08 pages.
https://teslamotorsclub.com/tmc/threads/lane-change-notification. 252072/, dated Dec. 29, 2021, 4 pages.
John Deere, Active Fill Control Retrieved from internet on Jun. 27, 2023, 2 pages. <https://www.deere.com/en/technology-products/precision-ag-technology/guidance/active-fill-control/>.
John Deere, Machine Sync Retrieved front internet: Jun. 27, 2023, 3 pages. <https://www.deere.com/en/technology-products/precision-ag-technology/guidance/machine-sync/>.
Huang, Xiaoshui & Mei, Guofeng & Zhang, Jian & Abbas, Rana. (2021). A comprehensive survey on point cloud registration, Mar. 5, 2021, 17 pages. Retrieved from internet: <https://www.researchgate.net/publication/349787695_A_comprehensive_survey_on_point_cloud_registration>.
U.S. Appl. No. 18/334,886 Application and Drawings filed Jun. 14, 2023, 47 pages.
U.S. Appl. No. 18/447,718 Application and Drawings filed Aug. 10, 2023, 53 pages.
U.S. Appl. No. 18/465,580 Application and Drawings filed Sep. 12, 2023, 114 pages.
U.S. Appl. No. 18/358,401 Application and Drawings filed Jul. 25, 2023, 47 pages.
U.S. Appl. No. 18/471,701 Application and Drawings filed Sep. 21, 2023, 50 pages.
U.S. Appl. No. 18/334,863 Application and Drawings filed Jun. 14, 2023, 73 pages.
U.S. Appl. No. 18/334,869 Application and Drawings filed Jun. 14, 2023, 85 pages.
U.S. Appl. No. 18/334,861 Application and Drawings filed Jun. 14, 2023, 96 pages,.
U.S. Appl. No. 18/334,874 Application and Drawings filed Jun. 14, 2023, 59 pages.
Determine Volume of Solid, Oct. 16, 2019. 3 pages. https://knowledge.autodesk.com/support/autocad/learn-explore/caas/sfdcarticles/sfdcarticles/Determine-volume-of-solid.html#:~:text=To%20determine%20the%20volume%20of%20a%20solid%20object%2C%20use%20the,Press%20ENTER.
SolidWorks Calculating Volume of a Solid, Feb. 3, 2022, 6 pages. https://www.goengineer.com/blog/solidworks-calculating-volume-of-a-solid.
U.S. Appl. No. 63/381,178 Application and Drawings filed Oct. 27, 2022, 101 pages.
U.S. Appl. No. 63/381,187 Application and Drawings filed Oct. 27, 2022, 104 pages,.
U.S. Appl. No. 63/512,368 Application and Drawings filed Jul. 7, 2023, 101 pages.

* cited by examiner

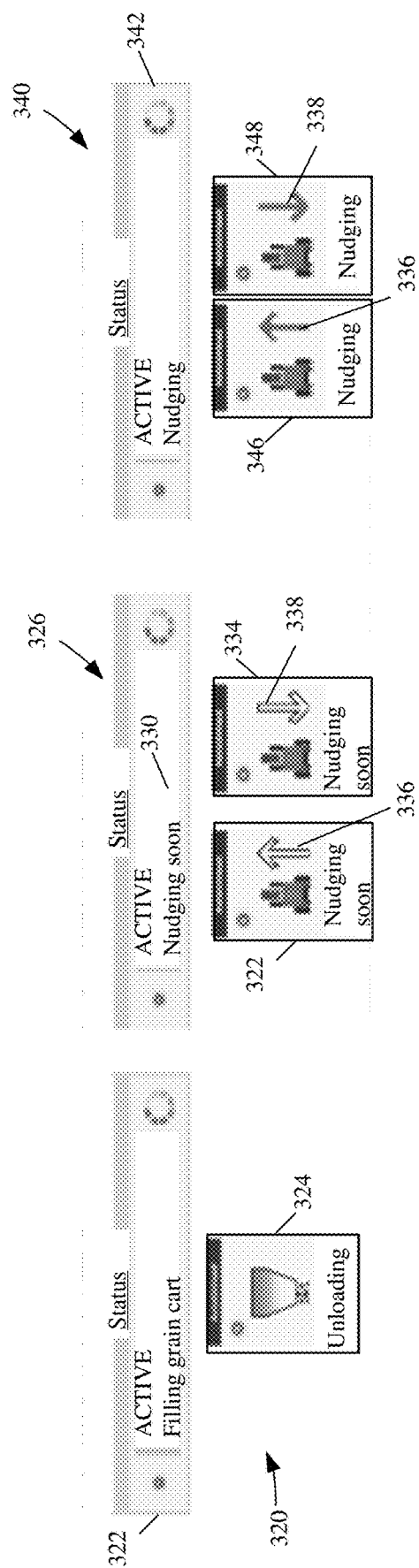

NUDGE PROXIMITY INDICATION DURING CONTROL OF AN UNLOADING OPERATION

CROSS-REFERENCE TO RELATED APPLICATION

The present application is based on and claims the benefit of U.S. provisional patent application Ser. No. 63/512,368, filed Jul. 7, 2023, U.S. provisional patent application Ser. No. 63/381,178, filed Oct. 27, 2022, and U.S. provisional patent application Ser. No. 63/381,187, filed Oct. 27, 2022, the content of which is hereby incorporated by reference in its entirety.

FIELD OF THE DESCRIPTION

The present description generally relates to machines that load material into receiving vehicles, such as harvesting machines that fill carts, semitrailers, or other agricultural receiving vehicles. More specifically, but not by limitation, the present description relates to automated control of an unloading operation with a nudge proximity indicator generated for display on a receiving vehicle.

BACKGROUND

There are a wide variety of different types of vehicles that load material into other vehicles. Some such vehicles include agricultural vehicles such as forage harvesters or other harvesters (such as combine harvesters, sugarcane harvesters, silage harvesters, etc.), that harvest grain or other crop. Such harvesters often unload material into carts, which may be pulled by tractors, or semitrailers, as the harvesters are moving. Other vehicles that unload material into receiving vehicles include construction vehicles, such as cold planers that unload into a dump truck, and other vehicles.

Taking an agricultural harvester as an example, while harvesting in a field using a forage harvester or combine harvester, an operator attempts to control the harvester to maintain harvesting efficiency, during many different types of conditions. The soil conditions, crop conditions, etc. can all change. This may result in the operator changing control settings. This means the operator needs to devote a relatively large amount of attention to controlling the forage harvester or combine harvester.

At the same time, a semitruck or tractor-pulled cart (a receiving vehicle), is often in position relative to the harvester (e.g., alongside the harvester or behind the harvester) so that the harvester can fill the semitrailer or cart, while moving through the field. In some current systems, this requires the operator of the harvester to control the position of the unloading spout and flap so that the truck or cart is filled evenly, but not over filled. Even a momentary misalignment between the spout and the truck or cart may result in hundreds of pounds of harvested material being dumped on the ground, rather than in the truck or cart.

The discussion above is merely provided for general background information and is not intended to be used as an aid in determining the scope of the claimed subject matter.

SUMMARY

A leading vehicle controls a following vehicle during a fill operation to change the positions of the two vehicles relative to one another. A control system generates a communication signal indicating that a position change operation that changes the position of the vehicles relative to one another is about to be executed. An operator display displays an indication of the position change operation prior to commencing the position change operation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 6A, 6B, and 6C show examples of operator interface displays.

DETAILED DESCRIPTION

Figure 1:
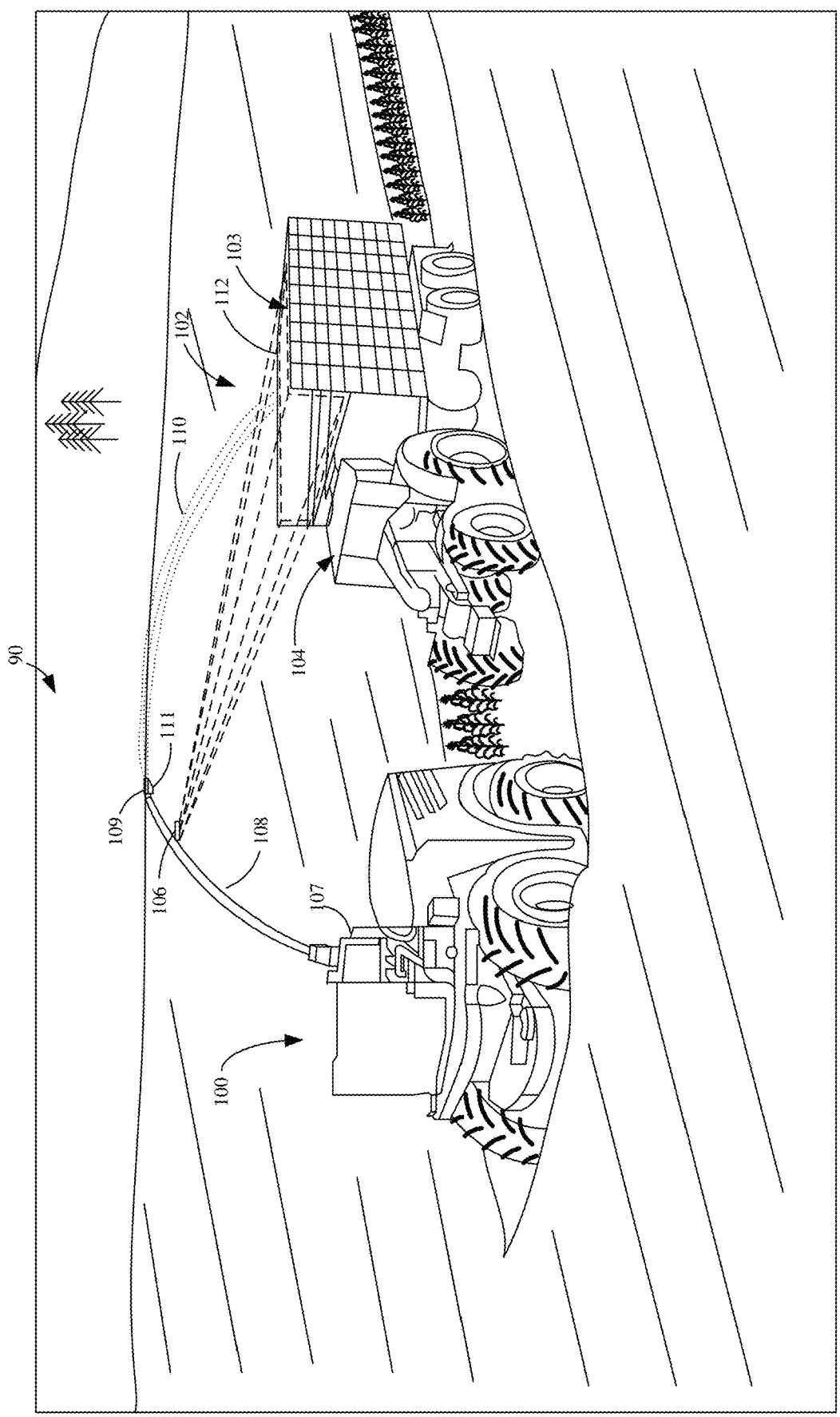
FIG. 1 is a pictorial illustration of one example of a forage harvester filling a tractor-pulled receiving vehicle, with the receiving vehicle following the forage harvester.

The present discussion proceeds with respect to an agricultural harvester, but it will be appreciated that the present discussion is also applicable to construction machines or other material loading vehicles as well. As discussed above, it can be very difficult for an operator to maintain high efficiency in controlling a harvester, and also to optimally monitor the position of the receiving vehicle during an unloading (or filling) operation. This difficulty can even be exacerbated when the receiving vehicle is located behind the harvester (such as a forage harvester), so that the forage harvester is executing a rear unloading operation, but the difficulty also exists in side-by-side unloading scenarios.

In order to address these issues, some automatic cart filling control systems have been developed to automate portions of the filling process. One such automatic fill control system uses a stereo camera on the spout of the harvester to capture an image of the receiving vehicle. An image processing system detects material height within the receiving vehicle, in order to automatically aim the spout toward empty spots and control the flap position (and thus material trajectory) to achieve a more even fill, while reducing spillage. Such systems can fill the receiving vehicle according to a fill strategy (such as front-to-back, back-to-front, etc.) that is set by the operator or that is set in other ways.

In addition, some current harvesters are provided with a machine synchronization control system. The harvester may, for instance, be a combine harvester so that the spout is not movable relative to the frame during normal unloading operations. Instead, the relative position of the receiving vehicle and the combine harvester is changed in order to fill the receiving vehicle as desired. Thus, in a front-to-back fill strategy, for instance, the relative position of the receiving vehicle, relative to the combine harvester, is changed so that the spout is first filling the receiving vehicle at the front end, and then gradually fills the receiving vehicle moving rearward. In such an example, the combine harvester and receiving vehicle may have machine synchronization systems which communicate with one another. When the relative position of the two vehicles is to change, the machine synchronization system on the combine harvester can send a message to the machine synchronization system on the towing vehicle to nudge the towing vehicle slightly forward or rearward relative to the combine harvester, as desired. By way of example, the machine synchronization system on the combine harvester may receive a signal from the fill control system on the combine harvester indicating that the position in the receiving vehicle that is currently being filled is approaching its desired fill level. In that case, the machine synchronization system on the combine harvester can send a "nudge" signal to the machine synchronization system on the towing vehicle. The "nudge", once received by the machine synchronization system on the towing vehicle, causes the towing vehicle to automatically momentarily speed up or slow down, thus nudging the position of the receiving vehicle forward or rearward, respectively, relative to the combine harvester. By automatically it is meant, for example, that the operation is performed without further human involvement except, perhaps, to initiate or authorize the operation.

For purposes of the present discussion, the term leading vehicle will be the vehicle that is unloading material into the receiving vehicle. The term following vehicle will refer to the propulsion vehicle, or towing vehicle (such as a tractor), that is providing propulsion to the receiving vehicle (such as a cart).

The operator of the following vehicle may have no warning that a nudge is about to occur. This can be disconcerting to the operator. Similarly, in systems in which the nudge is sent automatically, the operator of the leading vehicle may have no warning that a nudge is about to be sent, and therefore may manually intervene to initiate a nudge, resulting in a greater likelihood of operator error.

The present description thus proceeds, in one example, with respect to a system that generates a warning communication that a nudge is about to occur and sends that communication to a following vehicle. The following vehicle generates an output to indicate to an operator that a nudge is imminent. The present system can also generate an output on the leading vehicle for the operator of the leading vehicle. The warning communication may also identify the direction of the impending nudge, as well as an indicator indicating when a nudge is in progress.

FIG. 1 is a pictorial illustration showing one example of a self-propelled forage harvester 100 (a material loading vehicle also referred to as a leading vehicle) filling a tractor-pulled grain cart (or receiving vehicle) 102. Cart 102 thus defines an interior that forms a receiving vessel 103 for receiving harvested material through a receiving area 112. In the example shown in FIG. 1, a tractor 104 (a towing vehicle also referred to as a following vehicle), that is pulling grain cart 102, is positioned directly behind forage harvester 100

Also, in the example illustrated in FIG. 1, forage harvester 100 has a detector such as camera 106 mounted on the spout 108 through which the harvested material 110 is traveling. The spout 108 can be pivotally or rotatably mounted to a frame 107 of harvester 100. In the example shown in FIG. 1, the detector 106 is a stereo-camera or a mono-camera that captures an image (e.g., a still image or video) of the receiving area 112 of cart 102. Also, in the example shown in FIG. 1, the receiving area 112 is defined by an upper edge of the walls of cart 102.

When harvester 100 has an automatic fill control system that includes image processing, as discussed above, the automatic fill control system attempts to identify the location of the receiving area 112 by identifying the edges or walls of the receiving area and can then gauge the height of harvested material in cart 102, and the location of that material in the receiving vehicle. The system thus automatically controls the position of spout 108 and flap 109 to direct the trajectory of material 110 into the receiving area 112 of cart 102 to obtain an even fill throughout the entire length and width of cart 102, while not overfilling cart 102. By automatically, it is meant, for example, that the operation is performed without further human involvement except, perhaps, to initiate or authorize the operation.

For example, when executing a back-to-front automatic fill strategy the automatic fill control system may attempt to move the spout and flap or a machine synchronization system can position the vehicles relative to one another so the material begins landing at a first landing point in the back of vessel 103 of receiving vehicle 102. Then, once a desired fill level is reached in the back of vessel 103, the automatic fill control system moves the spout and flap or the machine synchronization system nudges the receiving vehicle to change the position of the vehicles relative to one another so the material begins landing just forward of the first landing point in vessel 103.

Figure 2:
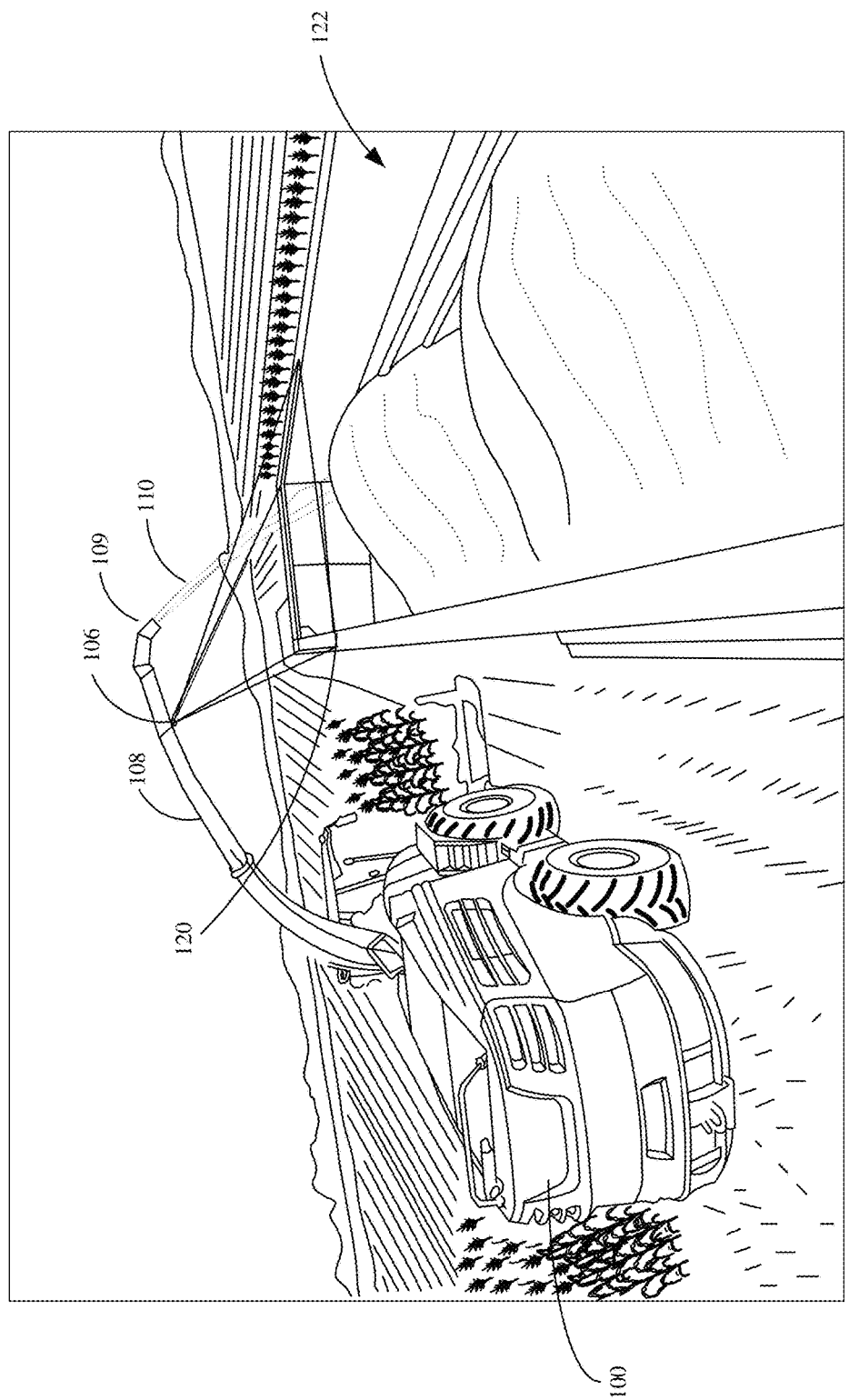
FIG. 2 is a pictorial illustration of one example of a forage harvester filling a receiving vehicle that is alongside the forage harvester.

FIG. 2 is a pictorial illustration showing another example of a self-propelled forage harvester 100, this time loading a semi-trailer (or receiving vessel on a receiving vehicle) 122 in a configuration in which a semi-tractor (also referred to as a following vehicle) is pulling semi-trailer 122 alongside forage harvester 100. Therefore, the spout 108 and flap 109 are positioned to unload the harvested material 110 to fill trailer 122 according to a pre-defined side-by-side fill strategy. Again, FIG. 2 shows that camera 106 can capture an image (which can include a still image or video) of semi-trailer 122. In the example illustrated in FIG. 2, the field of view of camera 106 is directed toward the receiving area 120 of trailer 122 so that image processing can be performed to identify a landing point for the harvested material in trailer 122. A machine synchronization system can nudge the semi-trailer forward or rearward relative to harvester 100 to accomplish a fill strategy.

Figure 3:
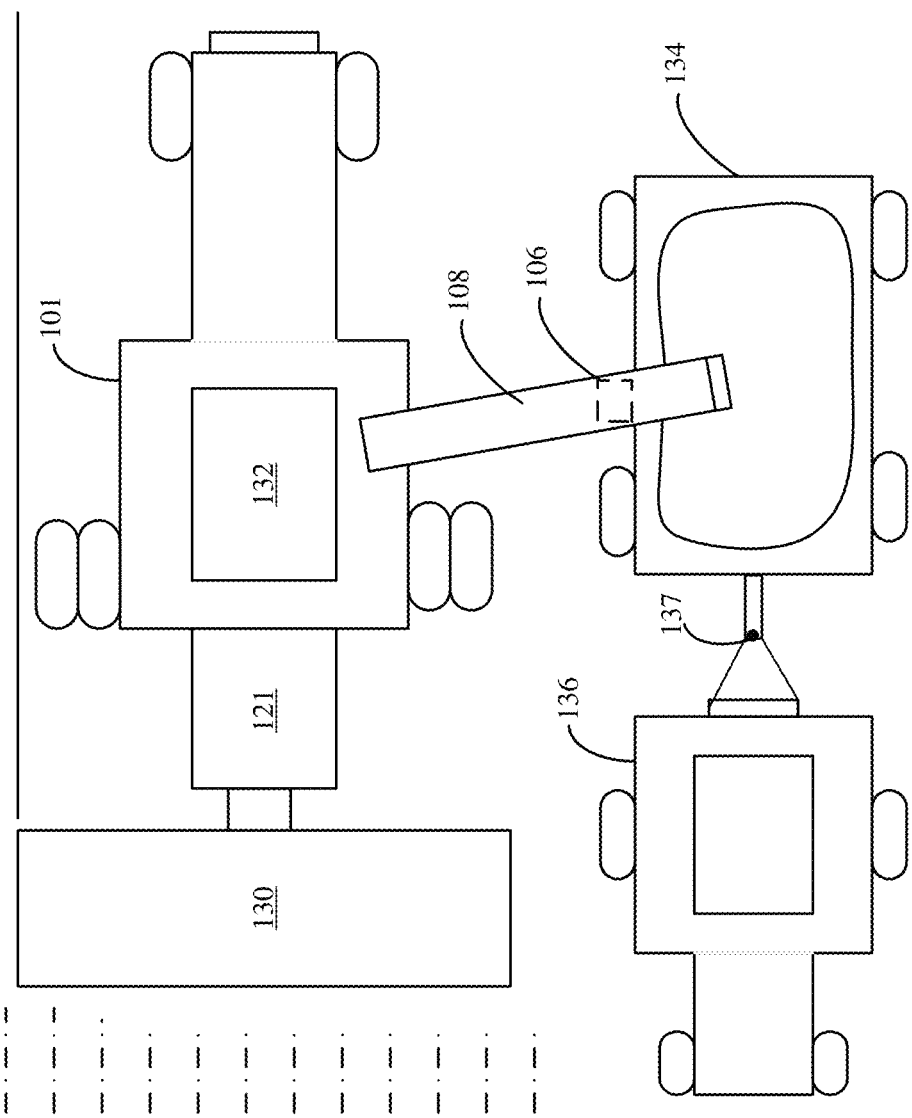
FIG. 3 shows a combine harvester filling a receiving vehicle.

FIG. 3 shows an example in which leading vehicle 101 is a combine harvester, with an operators compartment 121 and with a header 130 that engages crop. The crop is processed and placed in a clean grain tank 132, where it is unloaded (such as using an auger) through spout 108 into a receiving vehicle 134 (e.g., a grain cart) that is pulled by a following vehicle 136 (e.g., a tractor). FIG. 3 shows that receiving vehicle 134 is coupled to following vehicle 136 at a hitch point, or pivot point, 137. When harvester 101 is a combine harvester, it may be that the spout 108 is not moved relative to the frame of harvester 101 during normal unloading operations. Instead, the relative position of the receiving vehicle 134 and the combine harvester 101 is changed in order to fill the receiving vessel as desired. Thus, if a front-to-back fill strategy is to be employed, then the relative position of the receiving vessel in receiving vehicle 134, relative to the combine harvester 101, is changed so that the spout 108 is first filling the receiving vehicle 134 at the front end, and then gradually fills the receiving vessel moving rearward.

The present description proceeds with respect to a system in which, before the relative position of one or more of the vehicles is automatically changed by a "nudge" operation, an operator warning is provided to one or more of the vehicles so the operator(s) are aware of an imminent nudge operation. The present system can also provide the warning to show the direction of the impending nudge, and an indication showing that a nudge operation is underway.

Figure 4:
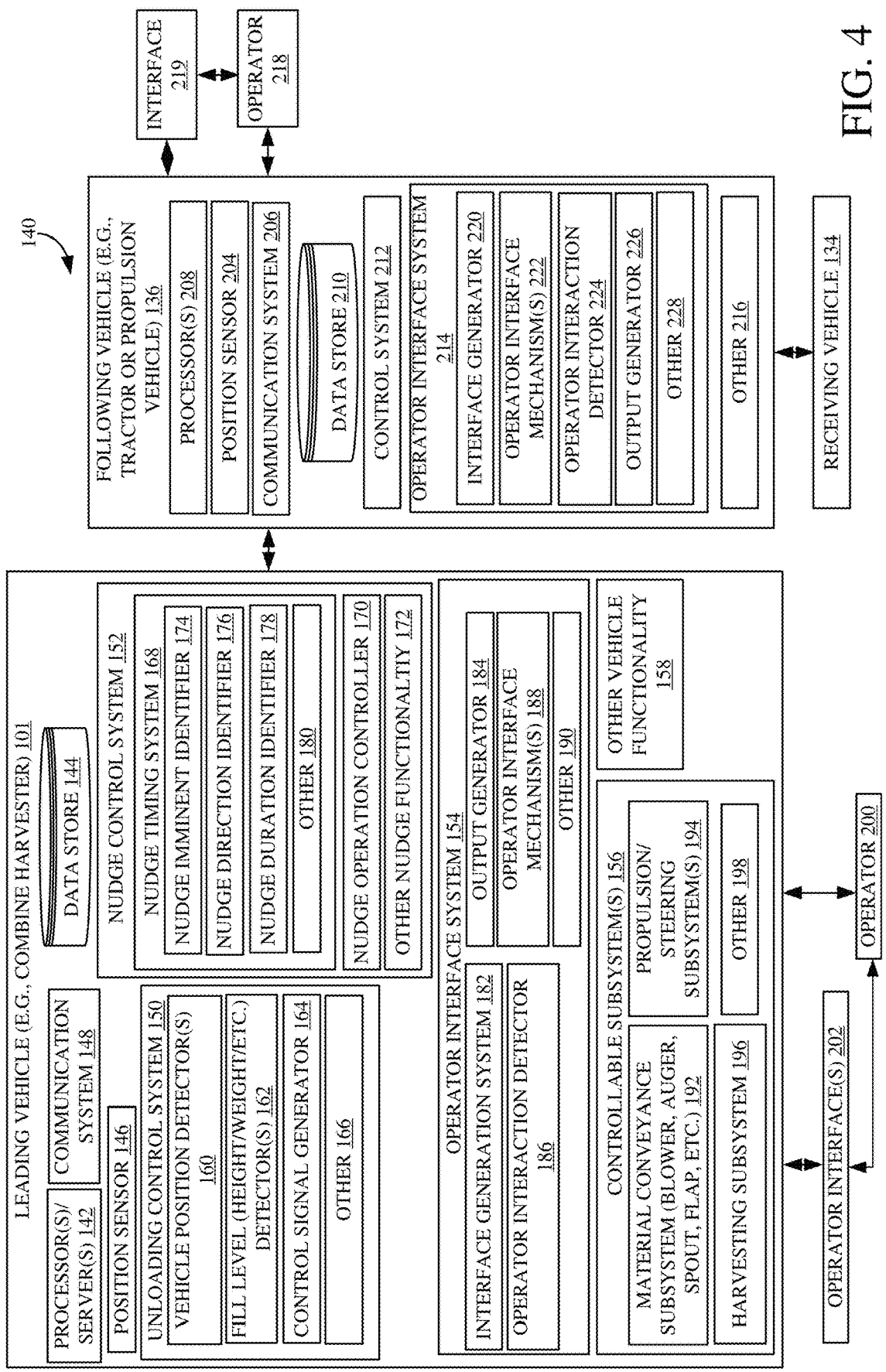
FIG. 4 is a block diagram of one example of an agricultural system.

FIG. 4 is a block diagram showing one example of an agricultural system 140 which includes leading vehicle (in the present example, a combine harvester) 101 which is followed by following vehicle (in the present example, a tractor or another propulsion vehicle) 136. Following vehicle 136 is pulling a receiving vehicle 134. It will be appreciated that while agricultural system 140 shown in FIG. 4 includes leading vehicle 101, following vehicle 136, and receiving vehicle 134 (e.g., the vehicles shown in the example illustrated in FIG. 3) other leading vehicles, following vehicles, and receiving vehicles can be used as well. The example shown in FIG. 4 is shown for the sake of example only.

Leading vehicle 101 includes one or more processors or servers 142, data store 144, position sensor 146, communication system 148, unloading control system 150, nudge control system 152, operator interface system 154, controllable subsystems 156, and other vehicle functionality 158. Unloading control system 150 can include vehicle position detector(s) 160, fill level (height/weight/etc.) detector 162, control signal generator 164, and other control system functionality 166. Vehicle position detector(s) 160 can include an optical sensor, a RADAR sensor, LIDAR sensor, and/or other sensors. An optical sensor can include camera 106, an image processor, and/or other items. Nudge control system 152 can include nudge timing system 168, nudge operation controller 170, and other nudge functionality 172. Nudge timing system 168 can include nudge imminent identifier 174, nudge direction identifier 176, nudge duration identifier 178, and other items 180. Operator interface system 154 can include interface generation system 182, output generator 184, operator interaction detector 186, operator interface mechanism(s) 188, and other interface devices and/or functionality 190. Controllable subsystems 156 can include material conveyance subsystem (e.g., blower, spout, flap, etc.) 192, propulsion/steering subsystem 194, harvesting subsystem 196, and/or other items 198. FIG. 4 also shows that leading vehicle 101 can be operated by an operator 200 by interacting with operator interface 202 and/or operator interface mechanism(s) 188. Operator 200 can be a human operator or an autonomous or semi-autonomous control system.

Following vehicle 136 can include position sensor 204, communication system 206, one or more processors or servers 208, data store 210, control system 212, operator interface system 214 (which can include an interface display generator 220, operator interface mechanism(s) 222, operator interaction detector 224, output generator 226, and other functionality 228), and any of a wide variety other functionality 216. FIG. 4 also shows that following vehicle 136 is operated by operator 218 who can interact with interfaces 219 (generated by operator interface system 214 and/or with operator interface mechanisms 222. Before describing the overall operation of agricultural system 140 in more detail, a description of some of the items in system 140, and their operation, will first be provided.

Position sensor 146 can be a global navigation satellite system (GNSS) receiver, a dead reckoning system, a cellular triangulation system, or any of a wide variety of other systems that identify the coordinates or location of leading vehicle 101 in a global or local coordinate system. Data store 144 can store dimension information and orientation information, such as information that identifies the location and orientation of optical sensor 106 relative to the material conveyance system (e.g., blower, spout, flap, etc.) 186. Data store 144 can store other information as well.

Communication system 148 enables the communication of items on vehicle 101 with other items on vehicle 101, as well as communication with following vehicle 136 and other communication. Therefore, communication system 148 can be a controller area network (CAN) bus and bus controller, a cellular communication device, a Wi-Fi communication device, a local or wide area network communication device, a Bluetooth communication device, and/or any of a wide variety of devices or systems that enable communication over different types of networks or combinations of networks.

Unloading control system 150 controls the unloading process by which material conveyance subsystem 192 conveys material from leading vehicle 101 to receiving vehicle 134. Vehicle position detectors 160 sense parameters indicative of the position of the receiving vehicle 134. In the example discussed herein, detectors 160 can detect structural portions of receiving vehicle 134 that allow the location of the receiving area of receiving vehicle 134 to be determined. The structural portions, for example, may be the front wall or top front edge of the receiving vehicle 134, the side walls or top side edges of receiving vehicle 134, the rear wall or the top rear edge of receiving vehicle 134, etc. Therefore, vehicle position detectors 160 can include a camera 106 and an image processor or other detectors. In other examples, vehicle position detector(s) 160 can be a RADAR sensor, and/or a LIDAR sensor, and/or sensor(s). Such sensors can have signal processing systems that process the signals generated by RADAR and LIDAR sensors and/or other sensor(s) to identify the receiving vehicle parameters. Detector(s) 160 can include other sensors and processing systems as well.

Vehicle position detectors 160 can detect the position of leading vehicle 101 and following vehicle 136 either in terms of absolute coordinates within a global or local coordinate system, or in terms of a relative position in which the positions of vehicles 101 and 136 are determined relative to one another. For instance, vehicle position detector(s) 160 can receive an input from position sensor 146 on vehicle 101 and from position sensor 204 (which may also be a GNSS receiver, etc.) on following vehicle 136 to determine where the two vehicles are located relative to one another. Vehicle position detector(s) 160 can then detect the location of receiving vehicle 134 relative to the material conveyance subsystem 192. This location can then be used to determine how to control vehicles 101 and 136 to perform an unloading operation so that material conveyance subsystem 192 loads material into receiving vehicle 134 according to a desired fill pattern.

Fill level detector 162 can detect the fill level of material in receiving vehicle 134. For instance, the fill level detector 162 can include camera 106 and an image processing system that detects the level of material in receiving vehicle 134 relative to the top edge of receiving vehicle 134. Fill level detector 162 may receive a weight signal from a scale on receiving vehicle 134 and identify the fill level in receiving vehicle 134 based on the weight signal and any estimated or measured density metric indicative of the density of the material. Fill level detector 162 can detect the fill level in other ways as well.

Control signal generator 164 generates control signals that can be used to control vehicle 101 and following vehicle 136 to accomplish the desired fill pattern. For instance, control signal generator 164 can generate control signals to control the material conveyance subsystem 192 to start or stop material conveyance, to control the spout position or flap position in order to control the trajectory of material that is being conveyed to receiving vehicle 134, or to control the propulsion/steering subsystem 194. Control signal generator 164 can also generate control signals (based on inputs received from nudge control system 152) that are sent by communication system 148 to the following vehicle 136 to "nudge" the following vehicle forward or rearward relative to leading vehicle 101, to instruct the operator 208 of following vehicle 136 to perform a desired operation, or to generate other control signals.

Nudge control system 152 can receive inputs from unloading control system 150, position detector 146, communication system 148, and operator interface system 188 (and from other systems) and determine when a nudge operation is to be generated which will change the relative position of leading vehicle 101 relative to following vehicle 136 (and thus relative to receiving vehicle 134). Nudge control system 152 can then generate outputs to the operators of one or both vehicles 101, 136 warning the operators of an upcoming nudge operation.

For instance, nudge control system 152 may receive an input from fill level detector 162 that is indicative of the fill level of material in receiving vehicle 134 at the current landing point in receiving vehicle 134. When the fill level at the current landing point is within a threshold level of the top of receiving vehicle 134, then a nudge may be issued in order to move the position where material is being conveyed to receiving vehicle 134 to a different landing point, in order to accomplish a desired fill pattern. As an example, in a front to back fill pattern, once the current landing point is at a desired level, then a nudge may be issued to move receiving vehicle 134 forward relative to material conveyance subsystem 192.

Nudge imminent identifier 174 thus determines when a nudge is imminent. For instance, nudge imminent identifier 174 may determine, based upon the current fill level of material in receiving vehicle 134, that the fill level will reach a desired fill level within the next 30 seconds so that a nudge operation will be executed to change the relative position of the vehicles with respect to one another. In that case, nudge imminent identifier 174 may generate an output indicating that a nudge operation will be commenced within 30 seconds (or any other desired time frame). Nudge direction identifier 176 generates an output indicative of the direction of the nudge (e.g., that following vehicle 136 will be nudged forward or backward relative to leading vehicle 101), and nudge duration identifier 178 may generate an output indicative of the duration of the nudge operation (e.g., based upon the distance between the current landing point in receiving vehicle 134 where the filling operation is occurring, and the next subsequent landing point in receiving vehicle 134). The signal generated by nudge imminent identifier 174 and nudge direction identifier 176 can be output (through control signal generator 164 or directly) to communication system 148 which communicates those signals to communication system 206 on following vehicle 136. Operator interface system 214 can then generate an interface 219 to warn operator 218 that a nudge operation is imminent. The output on interface 218 may also identify when the nudge operation will take place (e.g., in 30 seconds) and the direction of the nudge so that operator 218 knows what to expect.

Nudge operation controller 170 can then provide an output (either through control signal generator 164 or directly) to communication system 148 that can be used to control the propulsion system on following vehicle 136 to momentarily speed up or slow down vehicle 136 to nudge the vehicle in the desired direction relative to leading vehicle 101. Based upon the signals that cause following vehicle 136 to nudge forward or backward, operator interface system 214 can generate an output on display 219 indicating that a nudge operation is currently in progress. The output may also identify the direction of the nudge that is currently taking place and the remaining duration of the nudge operation. Nudge control system 152 can also provide outputs to operator interface system 154. Interface generation system 182 can generate operator interfaces 202 showing the nudge information to operator 200. This may be helpful where the nudge control system 152 automatically generates nudges, as described above.

Also, in one example, operator 200 can provide an input through operator interfaces 202 or through operator interface mechanisms 188 commanding a nudge operation. In that case, nudge imminent identifier 174 sends a warning message through communication system 148 to following vehicle 136 where a "nudge imminent" display can be displayed on interface 219 for operator 218. Nudge direction identifier 176 can also generate an output indicative of the direction of the nudge that has been commanded by operator 200. Nudge duration identifier 178 can generate an output indicative of the estimated duration of the nudge operation as well.

As mentioned, operator interface system 154 can generate interfaces 202 for operator 200 and receive inputs from operator 200. Therefore, operator interface system 154 can include interface mechanisms 188 such as a steering wheel, joysticks, pedals, buttons, displays, levers, linkages, etc. Interface generation system 182 can generate interfaces 202 for interaction by operator 200, such as on a display screen, a touch sensitive displays screen, or in other ways. Output generator 184 outputs that interface on a display screen or in other ways and operator interaction detector 186 can detect operator interactions with the displayed interface, such as the operator actuating icons, links, buttons, etc. Operator 200 can interact with the interface(s) 202 using a keyboard or keypad, a point and click device, touch gestures, speech commands (where speech recognition and/or speech synthesis are provided), or in other ways.

Position sensor 204 on following vehicle 136 may be a global navigation satellite system (GNSS) receiver, a dead reckoning system, a cellular triangulation system, or any of a wide variety of other systems that provide coordinates of following vehicle 136 in a global or local coordinate system, or that provide an output indicating the position of following vehicle 136 relative to a reference point (such as relative to leading vehicle 101), etc. Communication system 206 allows the communication of items on vehicle 136 with one another, and also provides for communication with leading vehicle 101, and/or other systems. Therefore, communication system 206 can be similar to communication system 148 discussed above, or different. It will be assumed for the purpose of the present discussion that communication systems 148 and 206 are similar, although this is for the sake of example only. Data store 210 can store dimension data which identify different dimensions of following vehicle 136, the location and/or orientation of different sensors on vehicle 136, kinematic information describing vehicle 134 and/or vehicle 136, and other information. Control system 212 can be used to receive inputs and generate control signals. The control signals can be used to control communication system 206, operator interface system 214, data store 210, the propulsion and/or steering subsystem on following vehicle 136, other controllable subsystems, and/or other items. Operator interface system 204 can also include interface generator 220 that can generate interfaces 219. Operator interface system 214 can also include operator interface mechanisms 222, such as a steering wheel, joysticks, buttons, levers, pedals, linkages, etc. Operator interface system 214 can also include a display screen that can be used to display operator interfaces 219 for interaction by operator 218. Operator 218 can interact with the operator interfaces using a point and click device, touch gestures, voice commands, etc. and those interactions can be detected by operator interaction detector 224. Output generator 226 can generate outputs to other items as well.

Figure 5A:
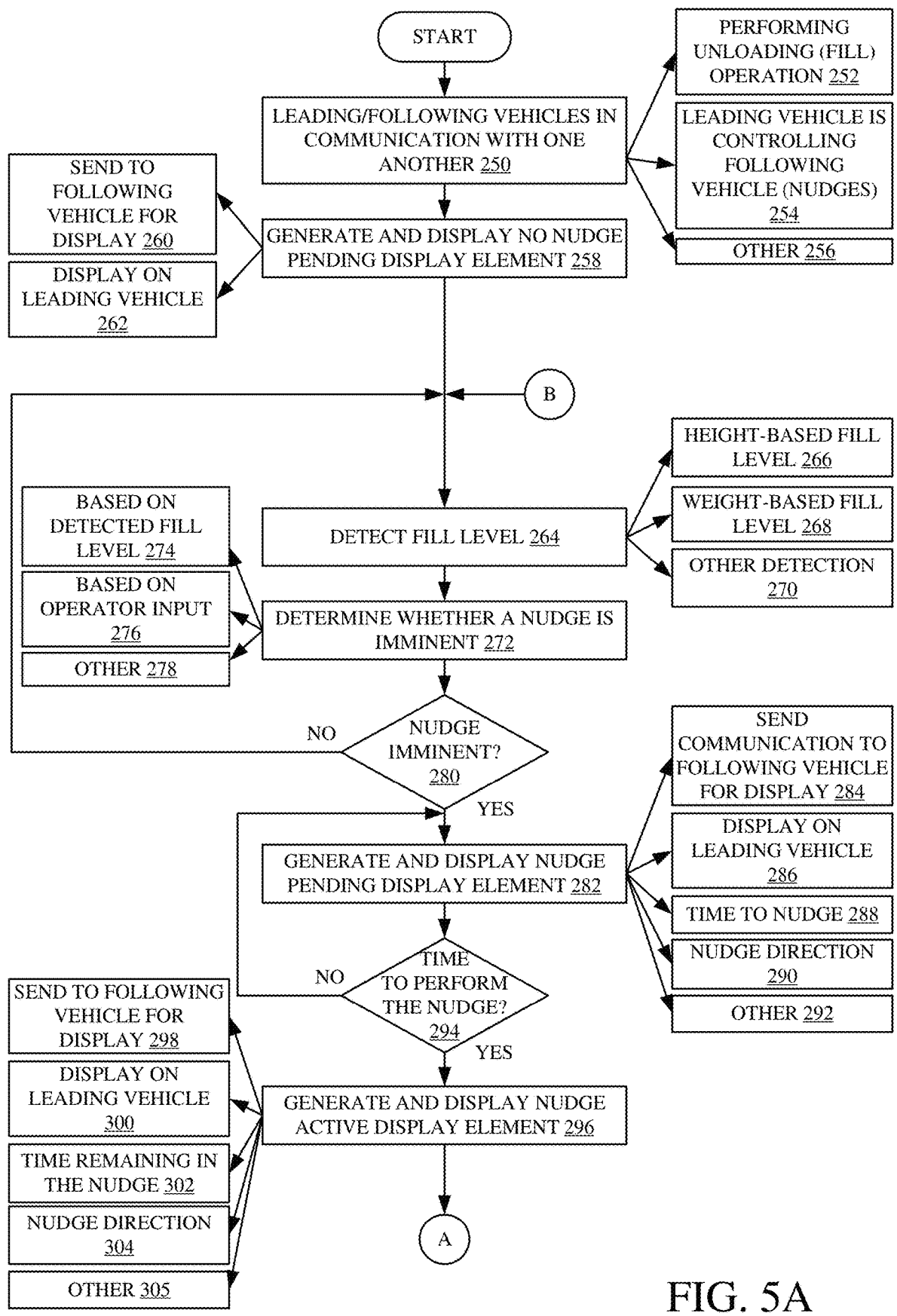
FIGS. 5A and 5B (collectively referred to as FIG. 5) show a flow diagram illustrating an example of the operation of the agricultural system in performing a nudge during a harvesting operation.
Figure 5B:
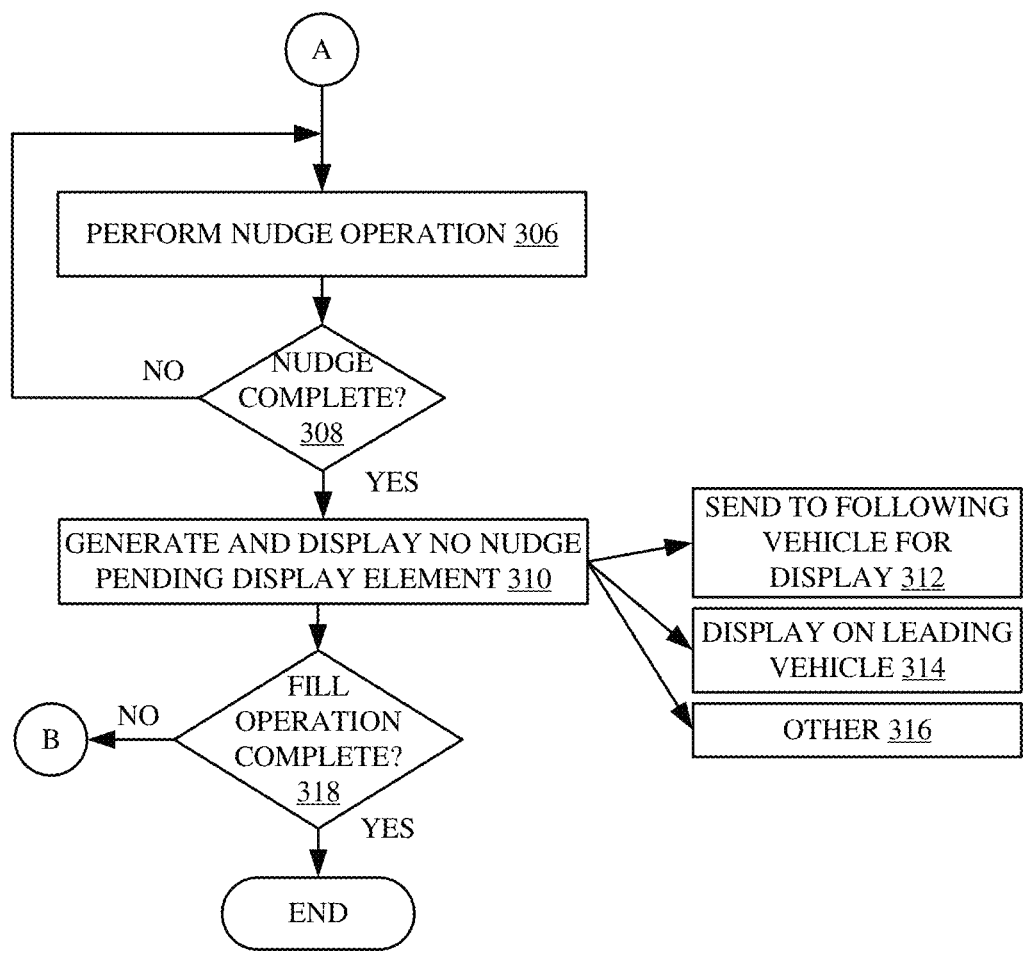

FIGS. 5A and 5B (collectively referred to herein as FIG. 5) show a flow diagram illustrating one example of the operation of agricultural system 140 in detecting imminent nudge operations, and generating communications indicative of the state of the nudge operations. It is first assumed that the leading and following vehicles (101, 136 respectively) are in communication with one another such as in a scenario where leading vehicle 101 is unloading material into receiving vehicle 134. Having the two vehicles in communication with one another is indicated by block 250 in the flow diagram of FIG. 5 and performing an unloading or fill operation in which material is being conveyed from leading vehicle 101 to receiving vehicle 134 is indicated by block 252. Also, it is assumed that the leading vehicle 101 is controlling the following vehicle (e.g., so the leading vehicle can initiate nudge operations) as indicated by block 254. The two vehicles can be arranged in other ways as well, as indicated by block 256.

In one example, it is assumed that, at a particular moment, the fill level is detected and that no nudge operation is imminent. In that case, nudge timing system 168 generates outputs indicating that no nudge operation is imminent, as indicated by block 258. A display element indicating that no nudge operation is currently imminent can be sent to the following vehicle 136, as indicated by block 260 in the flow diagram of FIG. 5, and can also be displayed on the leading vehicle 101, as indicated by block 262.

During the fill operation, fill level detector 162 detects the fill level of material in receiving vehicle 134, as the fill operation continues. Detecting the fill level is indicated by block 264 in the flow diagram of FIG. 5. As discussed elsewhere, fill level detector 162 can detect the fill level of material based on the height of the material (e.g., as detected by a camera 106 or other optical sensor or in other ways) as indicated by block 266. Fill level detector 162 can also detect the fill level based upon the weight of material in receiving vehicle 134, as indicated by block 268. The fill level can be detected in other ways as well, as indicated by block 270.

During the fill operation, nudge imminent identifier 174 continuously or intermittently determines whether a nudge operation is imminent, as indicated by block 272 in the flow diagram of FIG. 5. For instance, nudge imminent identifier 174 can determine that a nudge is imminent automatically based upon the fill level detected by fill level detector 162, as indicated by block 274. In another example, nudge imminent identifier 174 receives an indication that operator 200 has commanded a nudge operation, as indicated by block 276 in the flow diagram of FIG. 5. Nudge imminent identifier 174 can determine whether a nudge is imminent in other ways as well, as indicated by block 278. If, at block 280, it is determined that a nudge operation is not imminent, then processing reverts to block 258 where the display element indicating that no nudge operation is imminent continues to be displayed for operator 218 and/or operator 200.

If, at block 280, it is determined that a nudge operation is imminent, then a signal indicative of this is output from nudge imminent identifier 174 to control signal generator 164 and/or communication system 148. A warning communication is sent by communication system 148 to following vehicle 136 so that a "nudge pending" display element can be generated and displayed on interface 219 for operator 218. Generating and displaying a "nudge pending" display element is indicated by block 282 in the flow diagram of FIG. 5.

The "nudge pending" display element can be generated either by operator interface system 154 and sent to following vehicle 136, or the display element can be generated by operator interface system 214 for display on following vehicle 136. In either case, a communication indicating that a nudge operation is imminent or pending (e.g., that a nudge operation is about to be performed) is sent through communication system 148 to communication system 206 so that the display element can be displayed for operator 218. Sending the communication to following vehicle 136 for display is indicated by block 284 in the flow diagram of FIG. 5. It will also be noted that the display element that indicates that a nudge operation is about to be performed may also be displayed on operator interface 202 for operator 200 of leading vehicle 101, as indicated by block 286 in the flow diagram of FIG. 5.

The display element may also indicate a time at which the nudge operation will commence, as indicated by block 288. The time may be a counter that counts down the time until the nudge operation commences, or the time may be displayed in another way. The display element may also include a direction indicator that identifies the direction that the nudge operation will nudge following vehicle 136 (e.g., either forward or backward) relative to leading vehicle 101. Displaying the nudge direction is indicated by block 290 in the flow diagram of FIG. 5. The "nudge pending" display element may include any of a wide variety of other information 292 as well.

After the "nudge imminent" display element is displayed, at some point, it will be time to actually execute the nudge operation, as determined at block 294 in the flow diagram of FIG. 5. When the nudge operation begins, nudge timing system 168 also generates an output that can be used to generate a display element indicating that the nudge operation is currently taking place (e.g., "nudge active" display element), the direction that following vehicle 136 is being nudged, the duration of the nudge operation, etc. The display element can be displayed on interface 219 on following vehicle 136 and/or on operator interface 202 on the leading vehicle 101. Generating and displaying the "nudge active" display element is indicated by block 296 in the flow diagram of FIG. 5. Sending a communication indicative of the nudge active display element to the following vehicle 136 for display is indicated by block 298. Displaying the nudge active display element on the leading vehicle 101 is indicated by block 300. In one example, nudge duration identifier 178 also generates an output indicative of the time remaining in the nudge operation, and that time can be displayed as well, as indicated by block 302. Nudge direction identifier 178 also generates an output indicative of the direction of the nudge, as indicated by block 302. The "nudge active" display element can include other information and be generated and displayed in other ways as well, as indicated by block 304.

Nudge control system 152 then generates the control signals that can be output by control signal generator 164 to actually perform the nudge operation, or to send those signals to control system 212, which can perform the nudge operation. Performing the nudge operation is indicated by block 306 in the flow diagram of FIG. 5. Until the nudge operation is completed, as indicated by block 308, processing reverts to block 296 where the "nudge active" display element is displayed as the nudge operation is executed.

Once the nudge operation is completed, then nudge control system 152 provides an output indicating that the nudge has been completed so that the "no nudge pending" display element can again be displayed, as indicated by block 310. An indication that no nudge operation is pending can be sent to following vehicle 136 for display on interface 219, as indicated by block 312. The "no nudge pending" display element can also be displayed on operator interface 202 for operator 200 on leading vehicle 101, as indicated by block 314. The "no nudge pending" display element can be displayed in other ways as well, as indicated by block 316. Until the fill operation is complete, as determined at block 318, processing again reverts to block 264 where the system waits for another commanded nudge operation to be detected.

FIGS. 6A, 6B, and 6C show examples of display elements that can be generated and displayed for operator 218 of following vehicle 136 and/or for operator 200 of leading vehicle 101. FIG. 6A shows one example of a display element 320 which may be displayed as the "no nudge pending" display element. Display element 320 includes a first display portion 322 that indicates the status of the fill operation. Display portion 322 shows that the fill operation is being performed. A second display portion 324 shows another example of a display element that also indicates that the fill operation is being performed (or that leading vehicle 101 is unloading material into receiving vehicle 134).

Once nudge imminent identifier 174 determines that a nudge operation is imminent, then display element 326 (shown in FIG. 6B) can be generated. Display element 326 includes a first portion 328 that again gives the status of the unloading or fill operation. Portion 328 shows that the fill operation is active meaning that receiving vehicle 134 is being loaded with material from leading vehicle 101. Portion 328 also includes a nudge indicator 330 that indicates that a nudge operation will be performed soon. FIG. 6B also shows a plurality of other display portions 332 and 334. Display portion 332 indicates that a nudge operation will soon be performed, and also identifies the direction of the nudge operation using arrow 336. Display portion 332 thus indicates that the pending nudge operation will nudge the following vehicle 136 forward. Display portion 334 indicates that the nudge operation, which is soon to be performed, will nudge the following vehicle 136 backward, as illustrated by arrow 338. Further, portions 332 and 334 also include alphanumeric characters indicating that a nudge is imminent, such as by using the words "nudging soon".

FIG. 6C shows another example of a display element 340 which indicates that the nudging operation is currently taking place. Again, display portion 342 shows that the fill operation is active and includes an alphanumeric display portion 344 indicating that the nudging operation is being performed. Display portions 346 and 348 are similar to display portions 332 and 334 shown in FIG. 6B except that, instead of saying "nudging soon" as in FIG. 6B, display portions 346 and 348 say "nudging" to indicate that the nudging operation is currently being performed. Also, the arrows 336 and 338 are visually distinguishable from those shown in FIG. 6B, again to indicate that the nudging operation is currently being performed. For instance, in FIG. 6B arrows 336 and 338 are defined by outlines while in FIG. 6C those arrows are solid arrows. This of course, is just one example of how the display portions can visibly change to distinguish between when the nudging operation is imminent and when the nudging operation is actually being performed.

The present discussion thus proceeds with respect to a system that generates and displays a warning to inform the operator(s) that a nudge operation is about to be performed, the direction of the nudge, and when the nudge operation is being performed. This reduces the likelihood of erroneous operator intervention, thus improving the accuracy and effectiveness of the unloading operation.

Figure 7:
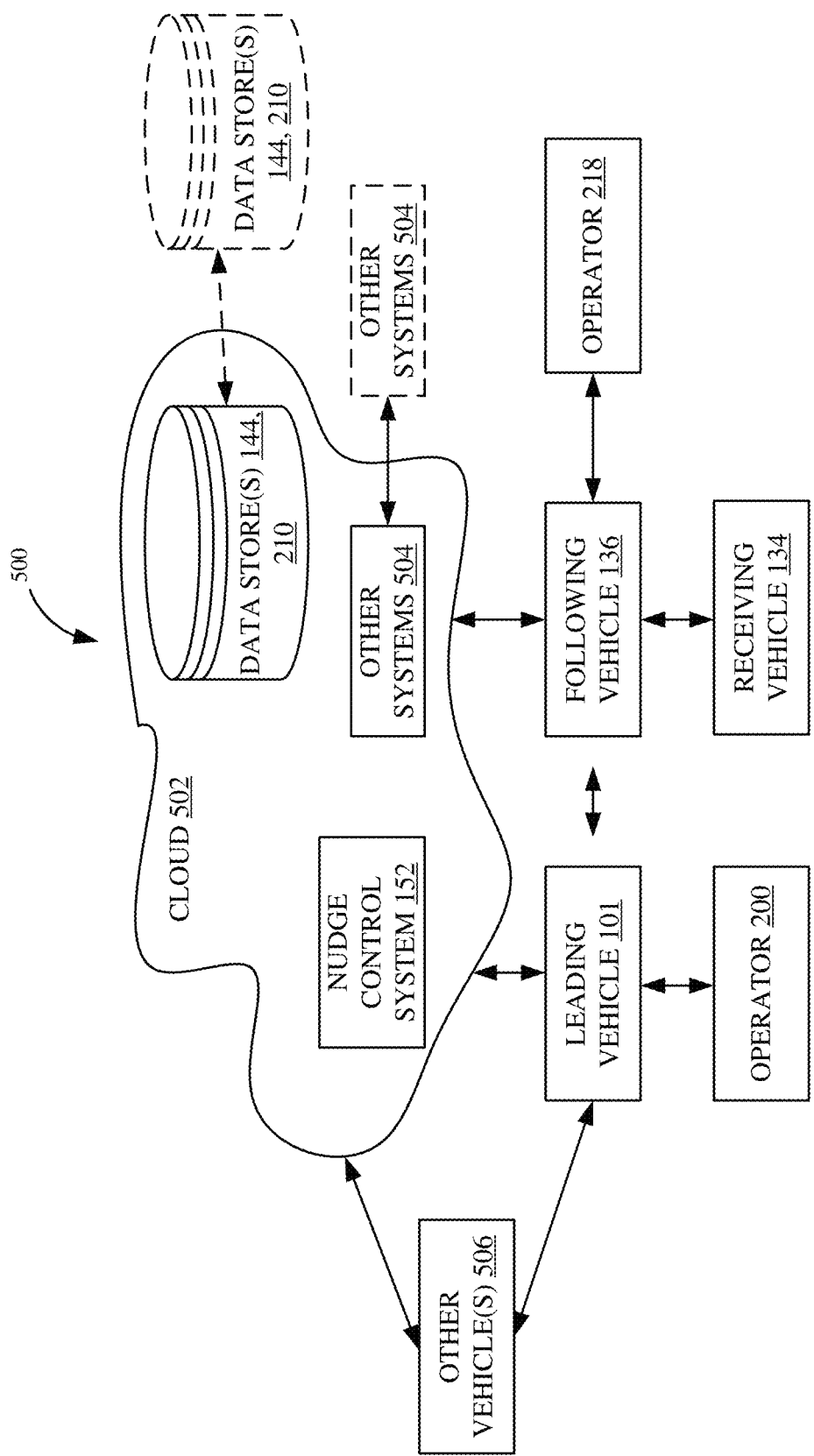
FIG. 7 is a block diagram showing one example of a harvesting machine deployed in a remote server architecture.

FIG. 7 is a block diagram illustrating agricultural system 140, shown in FIG. 4, except that system 140 is disposed in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 7, some items are similar to those shown in FIG. 4 and they are similarly numbered. FIG. 7 specifically shows that data stores 144, 210, nudge control system 152, and other systems 504, can be located at a remote server location 502. Therefore, vehicles 101, 136 can access those systems through remote server location 502.

FIG. 7 also depicts another example of a remote server architecture. FIG. 7 shows that it is also contemplated that some elements of FIG. 4 can be disposed at remote server location 502 while others are not. By way of example, one or more of data stores 144, 210 and other systems 504, or other items can be disposed at a location separate from location 502, and accessed through the remote server at location 502. Regardless of where the items are located, the items can be accessed either directly by machine 101 and/or machine 136, through a network (either a wide area network or a local area network), the items can be hosted at a remote site by a service, or the items can be provided as a service, or accessed by a connection service that resides in a remote location. Also, the data can be stored in substantially any location and intermittently accessed by, or forwarded to, interested parties. All of these architectures are contemplated herein.

FIG. 7 shows that other vehicles 506 can communicate with one or more vehicles 101, 136, or with remote server environment 502. It will also be noted that the elements of FIG. 4, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
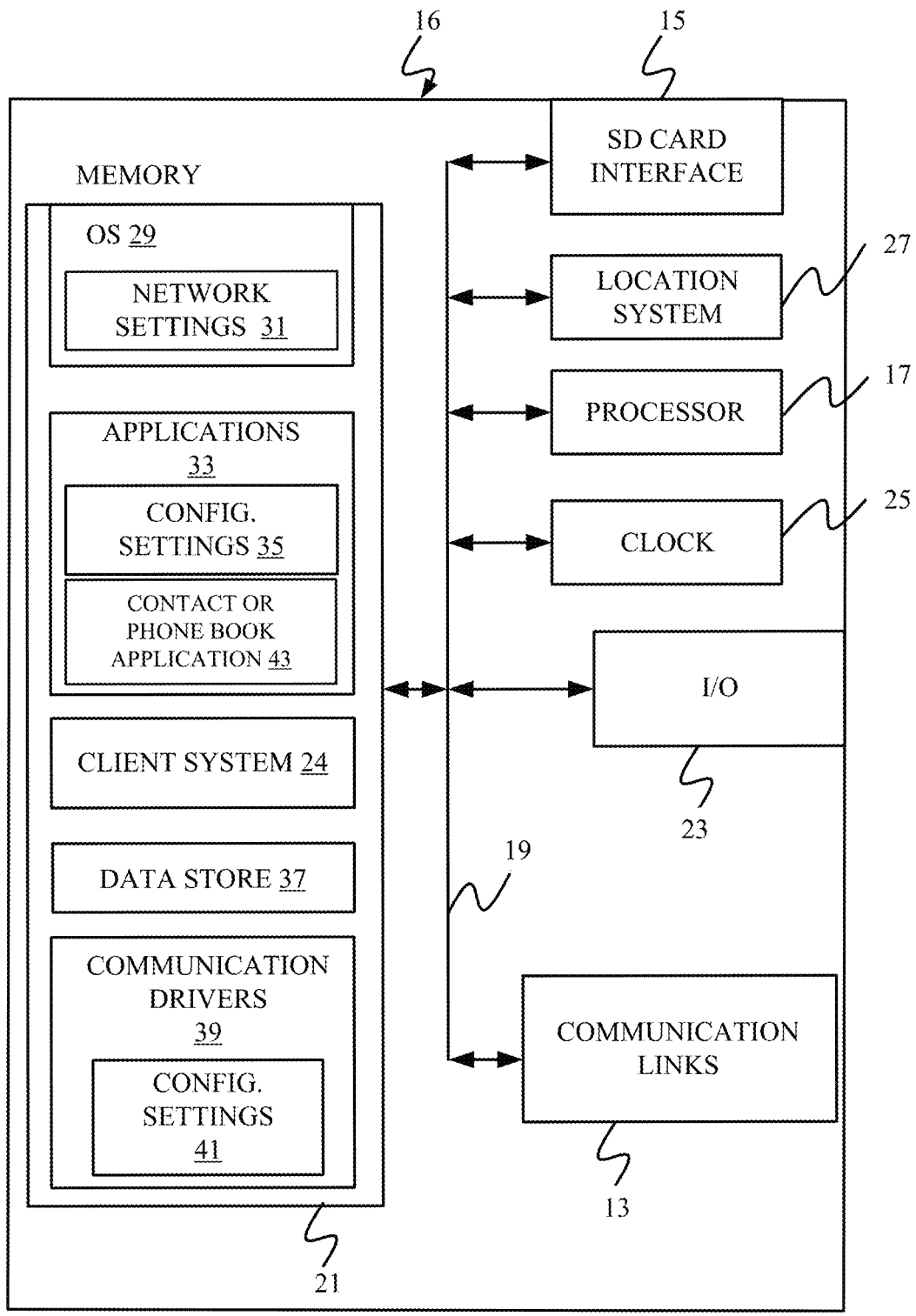
FIGS. 8-10 show examples of mobile devices that can be used in the machines and systems described in other figures.
Figure 9:
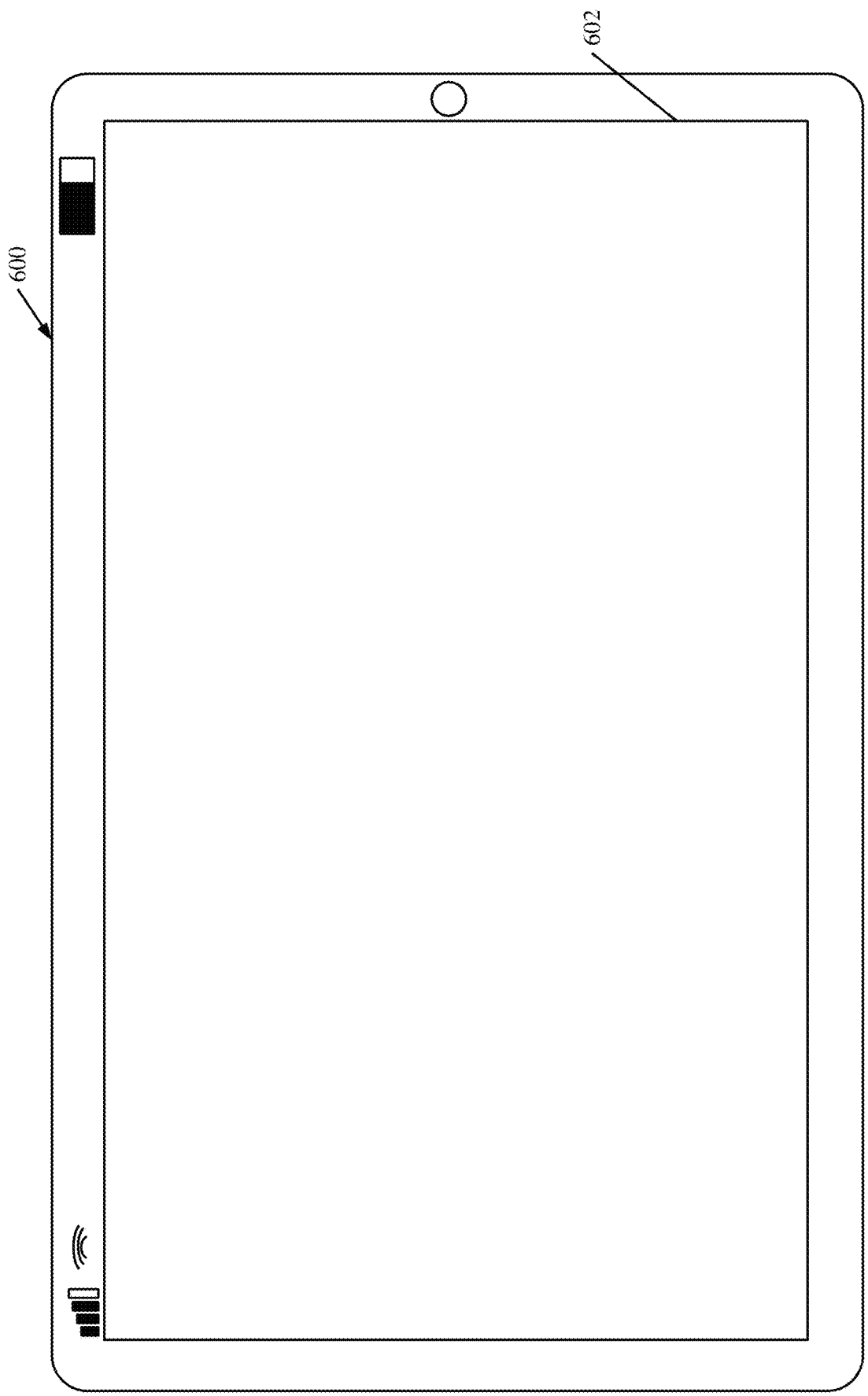
Figure 10:
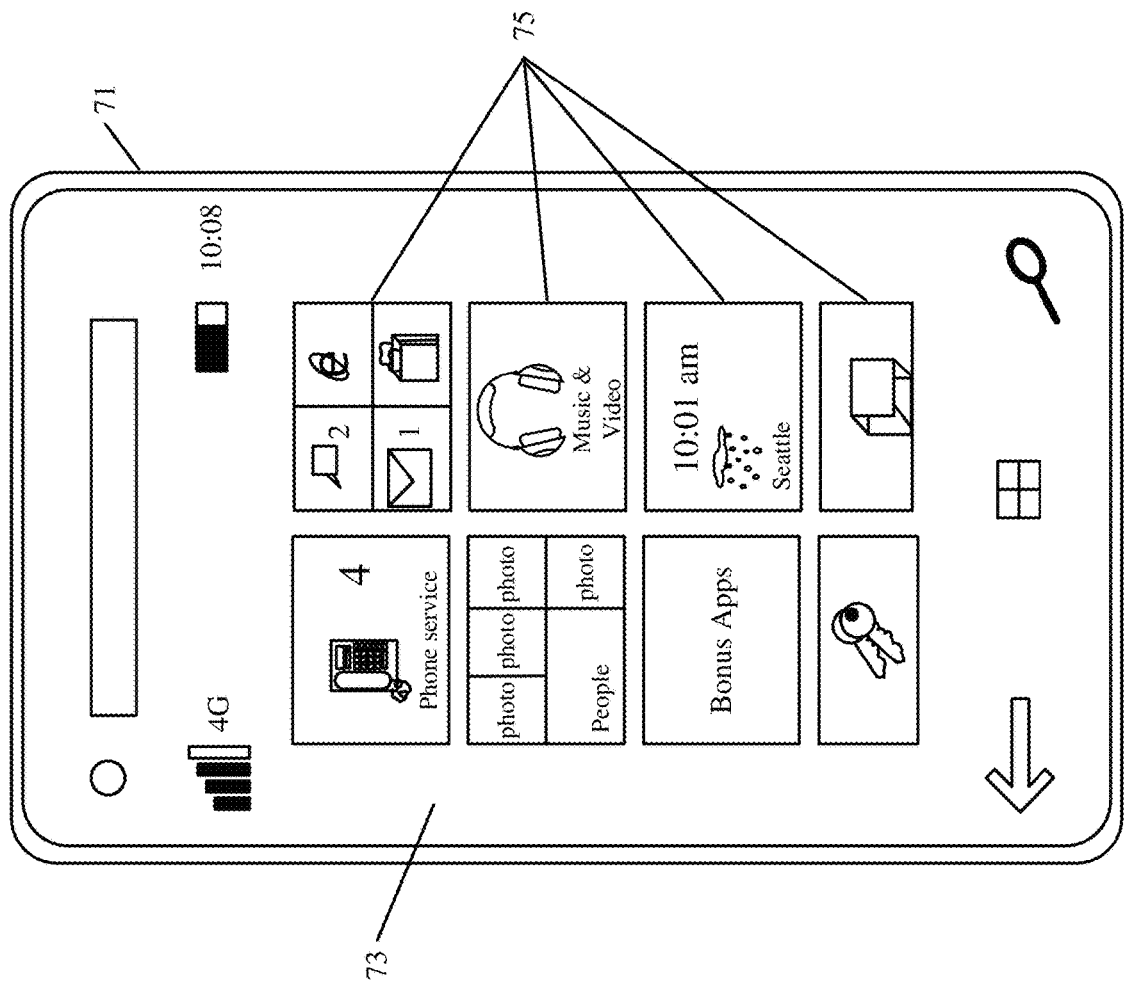

FIG. 8 is a simplified block diagram of one illustrative example of a handheld or mobile computing device that can be used as a user's or client's hand held device 16, in which the present system (or parts of it) can be deployed. For instance, a mobile device can be deployed in the operator compartment of one or both of vehicles 101, 136 for use in generating, processing, or displaying the calibrated offset values. FIGS. 9-10 are examples of handheld or mobile devices.

FIG. 8 provides a general block diagram of the components of a client device 16 that can run some components shown in FIG. 4, that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 9 shows one example in which device 16 is a tablet computer 600. In FIG. 9, computer 600 is shown with user interface display screen 602. Screen 602 can be a touch screen or a pen-enabled interface that receives inputs from a pen or stylus. Tablet computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
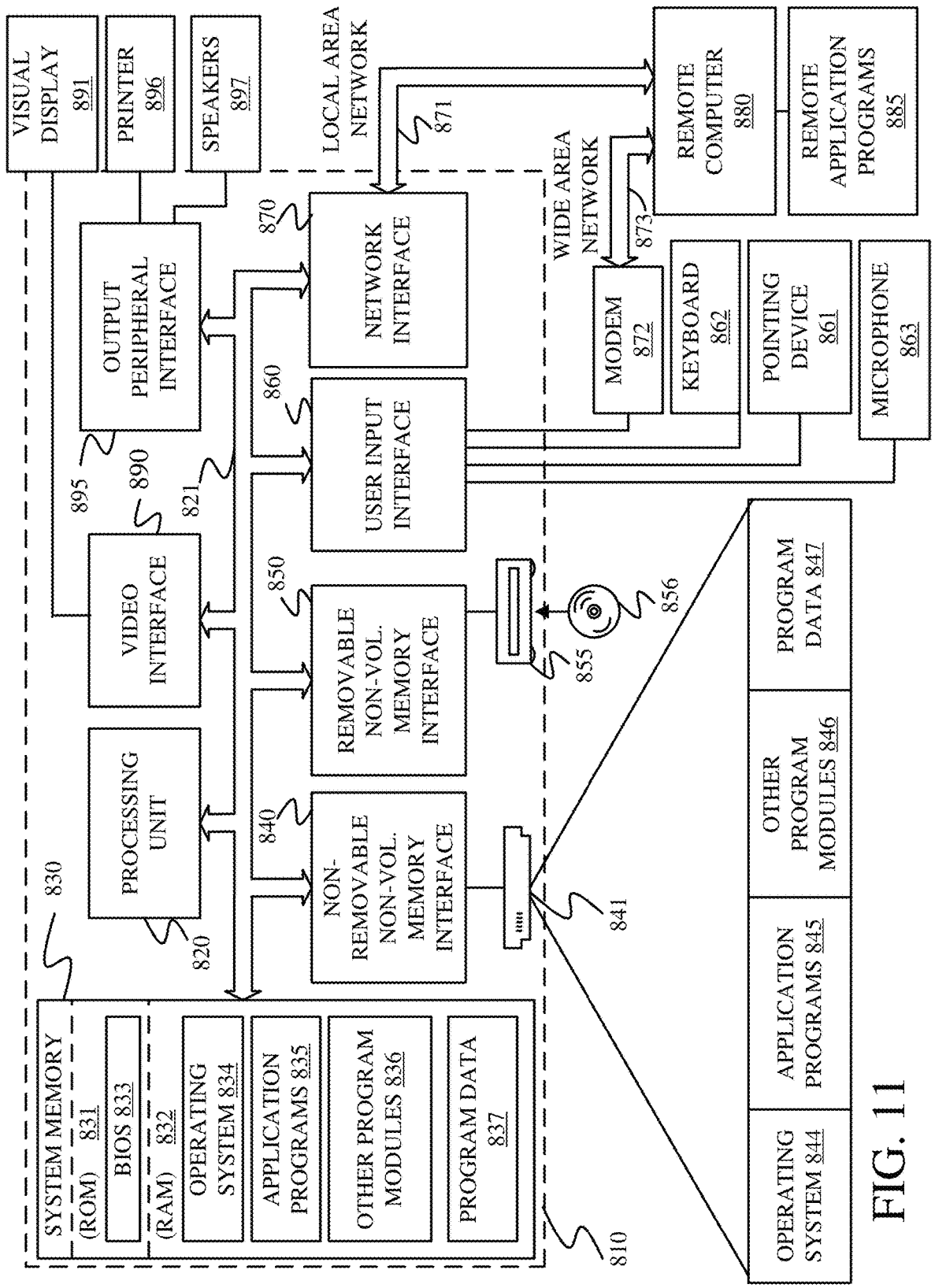
FIG. 11 is a block diagram showing one example of a computing environment that can be used in the machines and systems described with respect to previous figures.

FIG. 11 is one example of a computing environment in which elements of FIG. 4, or parts of it, (for example) can be deployed. With reference to FIG. 11, an example system for implementing some embodiments includes a computing device in the form of a computer 810 programmed to operate as discussed above. Components of computer 810 may include, but are not limited to, a processing unit 820 (which can comprise processors from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 4 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 11 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   performing an unloading operation unloading material from a leading vehicle to a receiving vehicle propelled by a following vehicle;
   detecting that a nudge operation is to be performed to change a relative position of the following vehicle relative to the leading vehicle;
   generating a nudge interface element indicating that the nudge operation is to be performed, wherein the nudge interface element renders an indicator of at least one characteristic of the change of the relative position of the following vehicle relative to the leading vehicle; and
   outputting the nudge interface element on an operator interface mechanism prior to performing the nudge operation.

2. The method of claim 1 wherein generating a nudge interface element comprises:
   generating a nudge pending display element.

3. The method of claim 2 wherein outputting the nudge interface element comprises:
   displaying the nudge pending display element on a display device on the leading vehicle.

4. The method of claim 2 wherein outputting the nudge interface element comprises:
   communicating an indication of the nudge pending display element to the following vehicle; and
   displaying the nudge pending display element on a display device on the following vehicle.

5. The method of claim 1 wherein detecting that a nudge operation is to be performed comprises:
   detecting a fill level indicative of a level of material in the receiving vehicle; and
   automatically detecting that the nudge operation is to be performed based on the detected fill level.

6. The method of claim 1 wherein detecting that a nudge operation is to be performed comprises:
   detecting a fill weight indicative of a weight of material in the receiving vehicle; and
   automatically detecting that the nudge operation is to be performed based on the detected fill weight.

7. The method of claim 1 wherein detecting that a nudge operation is to be performed comprises:
   detecting an operator nudge input commanding the nudge operation; and
   detecting that the nudge operation is to be performed based on the detected operator nudge input.

8. The method of claim 2 wherein generating the nudge pending display element comprises:

generating, as a portion of the nudge pending display element, a re-position direction indicator indicating a direction in which the following vehicle and the leading vehicle will be repositioned relative to one another by the nudge operation.

9. The method of claim 2 wherein generating the nudge pending display element comprises:
generating, as a portion of the nudge pending display element, a timing indicator indicating when the nudge operation will be performed.

10. The method of claim 1 and further comprising:
performing the nudge operation;
while performing the nudge operation, generating a nudge active display element indicating that the nudge operation is being performed; and
outputting the nudge active display element on an operator interface mechanism while performing the nudge operation.

11. The method of claim 10 wherein generating the nudge active display element comprises:
generating a nudge direction indicator indicating a direction in which the following vehicle and the leading vehicle are being repositioned relative to one another by the nudge operation.

12. The method of claim 1 wherein outputting the nudge interface element on an operator interface mechanism comprises:
displaying the nudge interface element on a mobile device.

13. The method of claim 1 wherein the indicator comprises at least one of:
a commencement time indicator indicating a time at which the nudge operation will commence;
a time duration indicator indicating a time remaining in the nudge operation; or
a nudge direction indicator indicating a direction in which the following vehicle and the leading vehicle are being repositioned relative to one another by the nudge operation.

14. An agricultural system, comprising:
a nudge control system configured to detect that a nudge operation is to be performed to change a relative position of a following vehicle that provides propulsion to a receiving vehicle, the receiving vehicle being configured to receive material from a leading vehicle during a fill operation;
an interface generation system configured to generate a nudge interface element indicating that the nudge operation is to be performed, wherein the nudge interface element renders an indicator of at least one characteristic of the change of the relative position of the following vehicle relative to the leading vehicle; and
an output generator configured to output the nudge interface element on an operator interface mechanism prior to performing the nudge operation.

15. The agricultural system of claim 14 and further comprising:
a communication system configured to communicate an indication of the nudge interface element to the following vehicle for display on a display device on the following vehicle.

16. The agricultural system of claim 15 and further comprising:
a nudge direction identifier configured to identify a nudge direction indicator indicating a direction in which the following vehicle and the leading vehicle will be repositioned relative to one another by the nudge operation, wherein the interface generation system is configured to generate the nudge interface element including a nudge direction display element based on the nudge direction indicator.

17. The agricultural system of claim 16 wherein the nudge control system comprises:
a nudge timing system configured to identify a nudge timing indicator indicating when the nudge operation will be performed, wherein the interface generation system is configured to generate the nudge interface element including a nudge timing display element based on the nudge timing indicator.

18. The agricultural system of claim 14 and further comprising:
a nudge operation controller configured to control performance of the nudge operation wherein the interface generation system is configured to generate a nudge active display element indicating that the nudge operation is being performed and wherein the output generator is configured to output the nudge active display element on an operator interface mechanism while performing the nudge operation.

19. An agricultural system, comprising:
at least one processor;
a data store that stores computer executable instructions which, when executed by the at least one processor, cause the at least one processor to perform steps, comprising:
during an unloading operation in which material from a leading vehicle is unloaded to a receiving vehicle propelled by a following vehicle detecting, detecting that a nudge operation is to be performed to reposition the following vehicle relative to the leading vehicle;
generating a nudge interface display element indicating that the nudge operation is to be performed and a direction indicator indicating a direction that the following vehicle and the leading vehicle are to be repositioned relative to one another by the nudge operation;
outputting the nudge interface display element to an operator interface mechanism prior to performing the nudge operation;
while performing the nudge operation, generating a nudge active display element indicating that the nudge operation is being performed; and
outputting the nudge active display element on an operator interface mechanism while performing the nudge operation.

20. The agricultural system of claim 19 wherein the operator interface mechanism comprises at least one of:
a display device on the following vehicle; or
a display device on the leading vehicle.

* * * * *